United States Patent
Gamert et al.

(10) Patent No.: US 9,574,291 B2
(45) Date of Patent: Feb. 21, 2017

(54) BASE INTERLINING, METHODS FOR THEIR MANUFACTURE AND APPLICATION THEREOF

(75) Inventors: Sven Gamert, Kist (DE); Krister Draxö, Helsingborg (SE)

(73) Assignee: Johns Manville, Denver, CO (US)

( * ) Notice: Subject to any disclaimer, the term of this patent is extended or adjusted under 35 U.S.C. 154(b) by 830 days.

(21) Appl. No.: 12/746,228

(22) PCT Filed: Dec. 8, 2008

(86) PCT No.: PCT/US2008/085845
§ 371 (c)(1),
(2), (4) Date: Mar. 30, 2011

(87) PCT Pub. No.: WO2009/079254
PCT Pub. Date: Jun. 25, 2009

(65) Prior Publication Data
US 2011/0223402 A1 Sep. 15, 2011

(30) Foreign Application Priority Data

Dec. 14, 2007 (DE) ........................ 10 2007 060 494

(51) Int. Cl.
| | |
|---|---|
| *D04H 3/004* | (2012.01) |
| *C08L 3/02* | (2006.01) |
| *C08L 3/04* | (2006.01) |
| *C08L 9/06* | (2006.01) |
| *C08L 13/00* | (2006.01) |
| *C09J 103/02* | (2006.01) |
| *C09J 103/04* | (2006.01) |
| *D04H 1/4218* | (2012.01) |
| *D04H 1/49* | (2012.01) |
| *D04H 1/64* | (2012.01) |
| *D04H 3/011* | (2012.01) |
| *D04H 3/02* | (2006.01) |
| *D04H 3/11* | (2012.01) |
| *D04H 3/12* | (2006.01) |
| *D04H 3/14* | (2012.01) |
| *D04H 3/16* | (2006.01) |
| *D06M 15/11* | (2006.01) |
| *D06M 15/227* | (2006.01) |
| *D06M 15/233* | (2006.01) |
| *D06N 5/00* | (2006.01) |
| *E04D 5/02* | (2006.01) |
| *C08K 5/053* | (2006.01) |
| *C08L 3/00* | (2006.01) |
| *C08L 9/02* | (2006.01) |

(52) U.S. Cl.
CPC ............... *D04H 3/004* (2013.01); *C08K 5/053* (2013.01); *C08L 3/02* (2013.01); *C08L 3/04* (2013.01); *C08L 9/06* (2013.01); *C08L 13/00* (2013.01); *C09J 103/02* (2013.01); *C09J 103/04* (2013.01); *D04H 1/4218* (2013.01); *D04H 1/49* (2013.01); *D04H 1/64* (2013.01); *D04H 3/011* (2013.01); *D04H 3/02* (2013.01); *D04H 3/11* (2013.01); *D04H 3/12* (2013.01); *D04H 3/14* (2013.01); *D04H 3/16* (2013.01); *D06M 15/11* (2013.01); *D06M 15/227* (2013.01); *D06M 15/233* (2013.01); *D06N 5/00* (2013.01); *E04D 5/02* (2013.01); *C08L 3/00* (2013.01); *C08L 9/02* (2013.01); *Y10T 428/249921* (2015.04); *Y10T 442/10* (2015.04); *Y10T 442/20* (2015.04); *Y10T 442/2762* (2015.04); *Y10T 442/2861* (2015.04); *Y10T 442/2893* (2015.04); *Y10T 442/291* (2015.04); *Y10T 442/2902* (2015.04)

(58) Field of Classification Search
USPC .... 442/152, 164, 1, 168, 169, 170; 428/219, 428/221; 524/52, 53
See application file for complete search history.

(56) References Cited

U.S. PATENT DOCUMENTS

| | | | | |
|---|---|---|---|---|
| 5,147,907 | A * | 9/1992 | Rinck et al. | ..................... 524/48 |
| 6,231,970 | B1 * | 5/2001 | Andersen | .................. C08L 3/02 106/145.1 |
| 6,818,686 | B1 * | 11/2004 | Colpaert | .................. C08L 1/02 524/17 |
| 8,053,528 | B2 * | 11/2011 | Shoemake | ..................... 525/222 |

FOREIGN PATENT DOCUMENTS

| | | |
|---|---|---|
| CH | 301 828 A | 9/1954 |
| WO | 95/21029 A | 8/1995 |

* cited by examiner

*Primary Examiner* — Lynda Salvatore
(74) *Attorney, Agent, or Firm* — Robert D. Touslee

(57) ABSTRACT

The invention relates to a novel binder system and its use for bonding textile fabrics as well as products containing such bonded textile fabrics. The materials according to the invention are suitable for manufacturing base interlinings which may be used for manufacturing base interlinings for sarking, roofing and sealing membranes, particularly for manufacturing coated sarking, roofing and sealing membranes.

20 Claims, No Drawings

BASE INTERLINING, METHODS FOR THEIR MANUFACTURE AND APPLICATION THEREOF

The invention relates to a novel binder system and its use in textile fabrics as well as to products containing the binder system or a textile fabric equipped therewith.

Textile fabrics, particularly base interlinings for the manufacture of roofing membranes have to meet a variety of requirements. In particular, base interlinings are to have a sufficient mechanical stability, such as good perforation strength and good tensile strength occurring, for example, in processing such as bituminizing or laying. Furthermore, a high heat stability, for example, during bituminizing or stability against radiating heat and resistance to spreading fire are required. Thus, there have been lots of trials to improve the present base interlinings as regards these requirements.

One way of improvement is to combine non-woven fabrics based on synthetic non-wovens with reinforcement fibers, such as glass fibers, in order to improve their mechanical stability. Examples for such sealing membranes can be found in the documents GB-A-1,517,595, DE-Gbm-77-39,489, JP-A-81-5879, EP-A-160,609, EP-A-176,847, EP-A-403,403 and EP-A-530,769. The non-woven fabric and the reinforcing fibers are bonded according to this state of the art either by conglutinating with a binding agent or by needle-punching the layers made of different materials.

Another way for improvement is to manufacture composite materials by knitting or stitch bonding (DE-A-3,347,280, U.S. Pat. No. 4,472,086, EP-A-333,602 and EP-A-395,548) or to realize a combination of reinforcing fibers in the form of bi-component fibers with non-woven fabrics based on synthetic fibers (U.S. Pat. No. 4,504,539 and EP-A-0,281, 643).

The technical textile fabrics known from the state of the art show good application-specific properties, however, the permanent task remains to still improve even these products, with no increasing manufacturing costs, if possible.

Thus, the task of the present invention was to provide improved textile fabrics being particularly suitable as base interlining for coated sarking, roofing and sealing membranes and which may be manufactured in commercial amounts at a reasonable price. A further task of the invention is to make sure that the textile fabrics may be provided with a coating by known and established methods.

Surprisingly, it has now been found that textile fabrics being solidified by means of a special binder system have improved heat dimensional stability and that in spite of water absorption the ageing characteristics, the flexibility or stabilities have not significantly declined.

Thus, the object of the present invention is a textile fabric being solidified with a binder system, comprising:
a) 10 to 90 wt % of an aqueous dispersion of polymerisates based on conjugated aliphatic dienes and vinyl aromatic compounds
b) 90 to 10 wt % starch,
c) 0 to 10 wt % additives,
with the figures for the percentage by weight relating to the dry mass of the binder system, i.e. without water.

Another object of the present invention is the binder system used according to the invention.

Surprisingly, the textile fabric manufactured by means of the binder system according to the invention has a higher heat dimensional stability compared to the textile fabrics which have only been bonded with component a). Also surprisingly, the stabilities and the ageing characteristics remain steady, although a person skilled in the art would expect deterioration.

The textile fabric solidified according to the invention is improved as regards stability, ageing characteristics and flexibility compared to the textile fabric having only component b) as a binder.

By partly using starch as a replacement, significant cost savings may be realized. Additionally, a completely formaldehyde-free binder system is obtained without having to accept cutbacks in product properties. Surprisingly, product properties are even improved.

The aqueous dispersion of polymerisates based on conjugated aliphatic dienes and vinyl aromatic compounds used according to the invention are known as such. Suitable dispersions and manufacturing methods are described, for example, in DE-A-2602445, DE-A-2602444 and U.S. Pat. No. 3,575,913.

Normally, known emulgators or protective colloids may be added to stabilize the aqueous polymer dispersions. These are known to the person skilled in the art (cf. Houben-Weyl, Methoden der org. Chemie, vol. XIV/1, 1961, Stuttgart). Examples for emulgators are polyalkylene glycol, sulfonated parafinic hydrocarbons, higher alkyl sulphates (e.g. lauryl sulphate), alkaline metallic salt of fatty acids, such as sodium stearate or sodium oleate, sulfuric acid semi-ester of ethoxylated fatty acid alcohols, salts of esters and semi-esters of alkylpolyoxyethylene sulphosuccinates, salts of sulphonated alkyl aromates, such as sodium dodecylbenzenesulphonate, ethoxylated C4-C12-alylphenoles and their sulphonation products, as well as esters of sulphosuccinic acid. Examples for protective colloids are alkylhydroxyalkylcelluloses, partly or completely hydrolysed polyvinylalcohols and copolymers thereof, acrylic acid, homopolymers and copolymers and partly neutralized salts thereof, acrylamide copolymers, polyacrylate copolymers and salts thereof, carboxyalkylcellulose, such as carboxymethylcellulose and its salts.

Furthermore, the polymer dispersions may have carboxyl groups inserted in the polymers for stabilization.

The aqueous dispersions used according to the invention are normally manufactured by emulsion polymerization of:
a) 20 to 80 parts by weight of conjugated aliphatic dienes,
b) 20 to 80 parts by weight of vinyl aromatic compounds,
c) 0 to 10 parts by weight of ethylenic unsaturated carboxylic acids and/or dicarboxylic acids,
d) 0 to 20 parts by weight of ethylenic unsaturated carboxylic acid nitriles
in the presence of water, emulgators and water soluble initiators.

The content of emulgators usually amounts to 1 to 5 parts by weight (in relation to 100 parts by weight of the components a) to d)).

Preferred dispersions may be obtained by emulsion polymerization of 25 to 65 parts by weight of component a), 25 to 65 parts by weight of component b), 0.1 to 6 parts by weight of component c) and/or 0.1 to 15 parts by weight of component d).

Particularly preferred dispersions contain maximally 5 parts by weight of ethylenic unsaturated carboxylic acids and/or dicarboxylic acids, particularly maximally 3 parts by weight of ethylenic unsaturated carboxylic acids and/or dicarboxylic acids, very particularly preferred no ethylenic unsaturated carboxylic acids and/or dicarboxylic acids, comprising the acids mentioned above as well as derivatives thereof.

Particularly preferred dispersions contain maximally 5 parts by weight of ethylenic unsaturated carboxylic acid nitriles, particularly maximally 3 parts by weight of ethylenic unsaturated carboxylic acid nitriles, very particularly preferred no ethylenic unsaturated carboxylic acid nitriles.

Butadiene, isoprene, pentadiene-1,3, dimethylbutadiene and/or cyclopentadiene are preferably considered as conjugated aliphatic dienes (component a)).

Styrene, a-methylstyrene and/or vinyltoluene are particularly mentioned as vinylaromatic compounds (component b)).

$\alpha,\beta$-monoethylenic unsaturated mono- and dicarboxylic acids with 3 to 6 C-atoms such as acrylic acid, methacrylic acid, maleic acid, fumaric acid and itaconic acid are preferably used as ethylenic unsaturated carboxylic acids and/or dicarboxylic acids (component c)).

Acryl nitrile and/or methacryl nitrile are particularly mentioned as ethylenic unsaturated carboxylic acid nitriles.

Systems normally used in emulsion polymerization are added as initiators. These water soluble systems, such as peroxides and azo compounds, are known to the person skilled in the art. Usually, the water soluble initiators are added in an amount of 0.1 to 2.0 wt % in relation to the total mass of the monomers to be polymerized.

Moreover, the known molecular weight regulators and other auxiliary agents, e.g. complexing agents for disturbing metal ions, or inhibitors, e.g. hydrochinon monomethylether, may be added for the emulsion polymerization (cf. Houben-Weyl, Methoden der organischen Chemie, vol. XIV/1, pp. 297 ff., 1961, Stuttgart; Hans-Georg Elias; Makromoleküle; 1990; Hüttig&Wepf Verlag, Basel, Heidelberg, N.Y.).

Insofar as unsaturated carboxylic acids and/or dicarboxylic acids (component c) are used for polymerization, neutralization with bases will be required.

The solids content of the dispersions used according to the invention amounts to between 30 and 70 wt %, preferably between 35 and 68 wt %, particularly preferred between 40 and 67 wt % (determined in accordance with DIN EN ISO 3251).

The viscosity of the dispersions used according to the invention amounts to between 10 and 2200 mPa·s, particularly between 10 and 500 mPa·s, particularly preferred between 15 and 300 mPa·s (determined in accordance with DIN EN ISO 3219 and 23° C.).

The polymer dispersions used according to the invention are preferably anionic dispersions. Further, bathotonic and/or thermally cross-linkable dispersions are preferred. Those thermal cross-linkable dispersions that cross-link at a temperature range between 120° C. and 200° C. are preferred. The bathotonic dispersions may already be partly cross-linked, particularly if parts of the water had been removed from the aqueous dispersion.

The dispersions used according to the invention are marketed under the designations such as Synthomer (Synthomer Ltd.), Lutofan® or Styrofan® (BASF AG), SRG Types (Dow Chemicals) and Plextol SBV Types (PolymerLatex).

The starches used according to the invention are not subject to any limitation, however, they have to be compatible with the aqueous polymer dispersion and also with the binder liquor. Suitable starches are natural—so-called—native starches and modified starches, such as cationic or anionic starches or starch derivatives (so-called chemically modified starches). Generally advantageous are starches having a sufficient solubility in cold and/or hot medium.

A group of starches that might be used in the context of the invention comprises starches extracted from vegetable raw materials. These include among others starches from tubers, such as potatoes, manioc, arrowroot, batata, from seeds, such as wheat, maize, rye, rice, barley, millet, oat, sorghum, from fruits, such as chestnuts, acorns, beans, peas, and other pulses, bananas, as well as from plant marrow, e.g. of the sago palm.

The starches which can be used in the context of the invention essentially consist of amylose and amylopectin in changing quantitive ratios.

The molecular weights of the starches useful according to the invention may vary in a wide range. The starches consisting essentially of a mixture of amylose and amylopectin, preferably have a molecular weight $M_w$ of between $5\times10^2$ and $1\times10^8$, particularly preferably between $5\times10^4$ and $1\times10^7$.

In addition to starches of native vegetable origin also starches are equally preferred which were chemically modified, enzymatically extracted, are of recombinant origin or were manufactured by biotransformation (biocatalysis).

The term "biocatalysis" is also used as a synonym for the term "biotransformation".

"Chemically modified starches" are defined as starches whose properties were chemically modified compared to the natural properties. This is essentially obtained by polymer analogue conversions, where starch is treated with mono-, bi- or polyfunctional reagents or oxidants. In this process, preferably the hydroxyl groups of the starch are modified by etherification, esterification or selective oxidation; or the modification is based on a radically initiated graft copolymerization of copolymerizable unsaturated monomers on the starch backbone.

To special chemically modified starches belong among others starch esters, such as xanthogenates, acetates, phosphates, sulfates, nitrates, starch ethers, such as non-ionic, anionic or cationic starch ethers, oxidized starches, such as dialdehyde starch, carboxy starch, starches degraded by persulfate and similar substances.

In the linguistic usage of the invention, "fermentative starches" refers to starches which are extracted in fermentative processes using natural organisms, such as fungi, algae or bacteria, or which may be extracted with the activation and help of fermentative processes. Examples for starches obtained from fermentative processes include among others gum arabicum and related polysaccharides (gellan gum, gum ghatti, gum karaya, gum tragacauth), xanthan, emulsan, rhamsan, wellan, schizophyllan, polygalacturonates, laminarin, amylose, amylopectin and pectines.

"Starches of recombinant origin" or "recombinant starches" in the invention refers to starches which are extracted in fermentative processes using unnatural organisms, but with the help of natural organisms that are modified by using genetic methods, such as fungi, algae or bacteria, or which may be extracted with the activation and help of fermentative processes. Examples for starches obtained from fermentative, genetically modified processes include among others amylose, amylopectin and polyglucanes.

In the context of the invention, "starches manufactured by biotransformation" means that starches, amylose, amylopectin or polyglucanes are manufactured by catalytic reaction of monomeric basic modules, i.e. generally oligomer saccharides, particularly mono- and disaccharides, using a biocatalyst (also: enzyme) under special conditions. Examples for starches obtained from biocatalytic processes are among others polyglucan and modified polyglucanes, polyfructan and modified polyfructanes.

Further, the invention also comprises derivatives of the individual starches mentioned. In this process, the terms "derivative of starches" or "starch derivatives" generally refer to modified starches, i.e. such starches in which the natural amylose/amylopectin ratio was modified, a pregelatinization was carried out, which were subject to a hydrolytic degradation or chemically derivatized.

To particular derivatives of starches belong among others oxidized starches, e.g. dialdehyde starch or other oxidization products with carboxyl functions, or native ionic starches (for example with phosphate groups) or ionically further modified starches, meaning both anionic and cationic modifications.

To the destructurized starches, which may be used in the context of the invention, belong those, which for example were homogenized by means of glycerine such that no more crystalline reflexes occur in the X-ray diffraction and starch grains or double refracting regions are no longer visible at a thousand-fold magnification in the polarization microscope. In this context, reference is made to document DE-A1-3931363, whose disclosure of destructurized starches is also part of the present description.

The starches used according to the invention are marketed e.g. by Avebe, Cargill, National Starch, Penford Products Co Purac or Südstärke.

Especially advantageous are starches which have a sufficient solubility in cold and/or hot medium. A sufficient solubility is given if the viscosity of the binder system according to the invention allows a respective workability.

The binder system used according to the invention may also contain up to 10 wt % additives. This includes commercial additives such as preservatives, stabilizers, antioxidants, antifoaming agents, waterproofing agents, UV stabilizers, fillers and/or pigments. They are partly contained in the commercial products and serve to stabilize storage and transport or may be added later in order to meet the customers specifications.

The quantity of the binder system according to the invention applied to the textile fabric preferably amounts to between 5 and 35 wt % of dry binder after drying, particularly 10 and 30 wt %, particularly preferred 10 and 25 wt % dry binder in relation to the total weight of the raw textile fabric.

The term "textile fabric" in the context of the present description is to be understood in its widest meaning. It may refer to all fiber fabrics being manufactured according to a fabric-forming technology. The fiber-forming materials include natural fibers and/or fibers made of synthesized polymers. Examples for such textile fabrics are woven fabrics, scrims, knitted fabrics as well as preferably non-woven fabrics.

Spunbonded non-wovens, so-called spunbonds manufactured by random deposition of freshly melt-spun filaments are preferred of the non-wovens made of synthetic polymer fibers. They consist of endless synthetic fibers made of melt-spunnable polymer materials. Suitable polymer materials are for example polyamids, such as polyhexamethylen diadipamide, polycaprolactam, aromatic or partially aromatic polyamides ("aramides"), aliphatic polyamides, such as nylon, partially aromatic or fully aromatic polyesters, polyphenylene sulphide (PPS), polymers with ether and keto groups, such as polyether ketones (PEK) and polyether etherketone (PEEK), polyolefins, such as polyethylene or polypropylene, or polybenzimidazoles.

Preferably, the spunbonded non-wovens consist of melt-spinnable polyesters. In principle, all types of polyester material suited for the production of fibers may be considered. Such polyesters for the most part consist of constituents derived from aromatic dicarboxylic acids and aliphatic diols. Common aromatic dicarboxylic acid constituents are the bivalent residues of benzene dicarboxylic acids, especially terephthalic acid and isophthalic acid; common diols have two to four C atoms, ethylene glycol being particularly suitable. Spunbonded non-wovens which consist of at least 85 mol % polyethylene terephthalate are particularly advantageous. The remaining 15 mol % are then made up of dicarboxylic acid units and glycol units, which act as so-called modification agents and which will enable the person skilled in the art to purposely influence the physical and chemical characteristics of the manufactured filaments. Examples of such dicarboxylic acid units are residues of isophthalic acid or of aliphatic dicarboxylic acid, such as glutaric acid, adipic acid, and sebacic acid; examples of modifying diol residues are those composed of longer-chain diols, such as propane diol or butane diol, of di or triethylene glycol or, if present in small quantities, of polyglycol with a molar weight of approximately 500 to 2000.

Polyesters containing at least 95 mol % of polyethylene terephthalate (PET) are particularly preferred, especially those composed of unmodified PET.

If the base interlinings shall additionally have a flame retardant effect, it is advantageous if they were spun of flame retardantly modified polyesters. Such flame retardantly modified polyesters are known. They contain additives of halogene compounds, particularly bromine compounds or, which is particularly advantageous, they contain phosphonic compounds that are condensed into the polyester chain.

Particularly preferably, the spunbonded non-wovens contain flame retardantly modified polyesters containing modules in the chain with the formula (I)

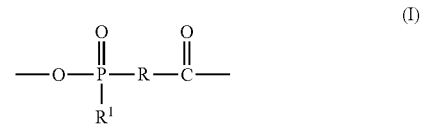

wherein R is alkaline or polyethylene with 2 to 6 C atoms or phenyl and $R^1$ is alkyl with 1 to 6 C atoms, aryl or an alkyl, are condensed into. Preferably, in the formula (I) R means ethylene and $R^1$ methyl, ethyl, phenyl or o-, m- or p-methylphenyl, particularly methyl. Such spunbonded non-wovens are, for example, described in DE-A-39 40 713.

The polyesters contained in the spunbonded non-wovens preferably have a molecular weight corresponding to an intrinsic viscosity (IV) of 0.6 to 1.4, measured in a solution of 1 g polymer in 100 ml dichloroacetic acid at 25° C.

The individual titers of the polyester filaments in the spunbonded non-woven amount to between 1 and 16 dtex, preferably between 2 and 8 dtex.

In a further embodiment of the invention, the textile fabric of the spunbonded non-woven may also be a fusible binder-bonded non-woven fabric, which contains base and hot melt adhesive fibers. The base and hot melt adhesive fibers may be derived from any thermoplastic filament-forming polymers. Base fibers may also be derived from non-melting filament-forming polymers. Such hot melt binder spunbonded non-wovens are described, for example, in EP-A 0,446,822 and EP-A 0,590,629.

Examples of polymers from which the base fibers may be derived are polyacrylonitrile, polyolefins, such as polyethylene or polypropylene, essentially aliphatic polyamides, such as nylon 6.6, essentially aromatic polyamides (aramides), such as poly-(p-phenylene terephthalate) or copolymers containing a proportion of aromatic m-diamine units to improve the solubility or poly-(m-phenylene isophthalate), essentially aromatic polyesters, such as poly-(p-hydroxy benzoate) or preferably essentially aliphatic polyesters, such as polyethylene terephthalate.

The relative proportion of the two fiber types may be selected within wide limits, whilst making sure that the proportion of the hot melt adhesive fibers is sufficient to bond the base fibers to the hot melt adhesive fibers, thereby endowing the non-woven fabric with a strength sufficient for the intend application. The proportion of the hot melt adhesive in the non-woven fabric originating from the hot melt adhesive fiber is usually less than 50 wt % (in relation to the weight of the non-woven fabric).

Modified polyesters having a melting point 10 to 50° C., preferably 30 to 50° C., lower than the raw material of the non-woven fabric are particularly considered as hot melt adhesive. Examples of such a hot melt adhesive are polypropylene, polybutylene terephthalate, or polyethylene terephthalate modified by the condensation of longer-chain diols and/or isophthalic acid or aliphatic dicarboxylic acid.

The hot melt adhesives are preferably incorporated into the non-wovens in fibrous form.

The base and hot melt adhesive fibers are preferably made up of one class of polymers. This means that all of the fibers used are selected from one class of substances, so that these may readily be recycled after the non-woven has been used. If the base fibers consist of polyester, for example, the hot melt adhesive fibers selected will likewise be of polyester or a mixture of polyesters, for example in the form of bi-component fibers with PET in the core and a polyethylene terephthalate copolymer having a low melting point as outer coat. In addition, however, bi-component fibers which are made up of different polymers are also possible. Examples of these are bi-component fibers of polyester and polyamide (core/outer coat).

The monofilament titre of the base and the hot melt adhesive fibers may be selected within wide limits. Examples of common titre ranges are 1 to 16 dtex, preferably 2 to 6 dtex.

Insofar as the base interlinings according to the invention with flame-retardant properties are additionally bonded, they preferably contain flame-retardant hot melt adhesives. A polyethylene terephthalate modified by inserting chain members of the formula (I) mentioned above may be present as flame-retardant hot melt adhesive in the layer fabric according to the invention.

In a preferred embodiment of the invention the textile fabric was subjected to mechanical and chemical bonding with the binder system according to the invention. Such a bonding further improves the application properties of the base interlining.

The bonding may be carried out in single steps or altogether whilst making sure that particularly in the presence of reinforcements an optionally present reinforcement is not or only very little damaged. The bonding is carried out by means of known methods. Without limiting the possible methods, mechanical methods, such as needle-punching, particularly hydrodynamic bonding as well as chemical and/or thermoplastic methods are suitable.

Insofar as the bonding is carried out by needle-punching, it is done with stitch densities of 20 to 100 pricks/cm$^2$, preferably with 40 pricks/cm$^2$. A hydrodynamic bonding may also be carried out instead of or additionally to mechanical needle-punching. Preferably, this process is waterjet needling. The pressure during waterjet needling is preferably between 5 and 600 bar, particularly between 50 and 450 bar, particularly preferred between 100 and 300 bar.

The nozzle diameter is between 0.05 and 0.25 mm, preferably between 0.07 and 0.2 mm. The nozzles are arranged in the form of so-called beams. The number of nozzles is between 10 and 60 nozzles per inch, preferably between 20 and 40 per inch.

Likewise other fluid media may be used instead of water and the waterjet needling may be carried out in several separate steps. The waterjet needling may be carried out with a continuous jet or as well by means of a pulsed waterjet, the pulse frequency not being limited. Waterjet needling is preferred particularly in the presence of reinforcements.

The filaments or staple fibers making up the non-woven fabrics may have a virtually circular cross section or may also have other shapes, such as dumb bell-shaped, reniform, triangular, trilobal or multilobal cross sections. Hollow fibers and bi-component or multi-component fibers may also be used. Further, the hot-melt adhesive fibers may also be used in the form of bi-component or multi-component fibers.

The textile fabric may be a single- or multilayered fabric.

The fibers forming the textile fabric may also be modified by means of the usual additives, for example by antistatic agents such as carbon black, or flame-retardant additives, such as fire protecting agents. Preferably, these additives are added to the binder system according to the invention.

The weight per unit area of the textile fabric, particularly of the spunbonded non-woven is between 20 and 500 g/m$^2$, preferably 40 and 400 g/m$^2$, particularly between 90 and 250 gg/m$^2$.

To the complete surprise of persons skilled in the art, the use of the binder system according to the invention improves the heat dimensional stability of the textile fabric. Thus, an improvement of the dimensional stability in longitudinal direction of at least 15% is detected (in relation to a textile fabric with binders based on styrol/butadien "SBR" dispersion binders), preferably of at least 20% and in cross direction an improvement of the dimensional stability of at least 15% is detected (in relation to a textile fabric with binders based on styrol/butadien "SBR" dispersion binders), preferably of at least 20%.

In a preferred embodiment of the invention the heat dimensional stability of the textile fabric bonded with the binder system according to the invention is maximally 1.6% in longitudinal direction and maximally 1.7% in cross direction, particularly maximally 1.5% in longitudinal direction and 1.5% in cross direction.

The heat dimensional stability is measured as follows: The samples are stamped out in the dimension 350 mm×100 mm (l/c) and measured. Afterwards the samples are loaded with a weight of 4 kg in longitudinal direction across their overall width and vertically hung into a drying oven for 10 minutes at a temperature of 200° C. The measurement of the dimensional variation is carried out after a 5 minutes cooldown while leaving the weight of 4 kg. The result in % represents the variation compared to the original value.

The textile fabrics according to the invention may be used as base interlining for coated sarking, roofing and sealing membranes, which also are object of the present invention.

In a further embodiment of the invention such base interlinings have at least on reinforcement. They are preferably designed such that the reinforcement absorbs a force so that the reference force of the base interlining with reinforcement in the stress-elongation diagram (at 20° C.) compared to the base interlining without reinforcement differs in the elongation range between 0 and 1% at least one location by at least 10%.

In a further embodiment the reinforcement may be inserted such that a force may only be absorbed at higher elongations.

The good mechanical properties of the base interlining are obtained particularly with reinforcing filaments and/or yarns whose Young module is at least 5 GPa, preferably at least 10 GPa, particularly preferred 20 GPa. The reinforcing filaments mentioned above, i.e. the monofilaments as well as the yarns have a diameter between 0.1 and 1 mm or 10-400 tex, preferably 0.1 and 0.5 mm, particularly 0.1 and 0.3 mm and have an elongation at rupture of 0.5 to 100%, preferably 1 to 60%. Particularly advantageously, the base interlings according to the invention have an elongation reserve of less than 1%.

The elongation reserve denotes the elongation acting on the base interlining before the acting force is diverted to the reinforcing filaments, i.e. an elongation reserve of 0% would mean that the tensile forces acting on the base interlining would immediately be diverted to the reinforcing filaments. That implies that the forces acting on the textile fabric do not lead to an alignment or orientation of the reinforcing filaments but are directly diverted to the reinforcing filaments such that damage to the textile fabric may be avoided. This is particularly demonstrated by a sharp increase of the force necessary for little elongations (stress-elongation diagram at room temperature). Additionally, the highest possible tensile force may be improved with the help of suitable reinforcing filaments having a high elongation at rupture. Mono- or multifilaments made of polyester, for example, are suitable reinforcing filaments.

As reinforcing filaments multi- and/or monofilaments are preferred based on aramids, preferably so-called high-module aramids, carbon, glass, glass rovings, mineral fibers (basalt), high-strength polyester monofilaments or multifilaments, high-strength polyamide monofilaments or multifilaments, as well as hybrid multifilament yarns (yarns containing reinforcing filaments and lower melting binder fibers) or wires (monofilaments) made of metals or metallic alloys.

For economic reasons preferred reinforcements consist of glass multifilaments in the form of—essentially—parallel warps or scrims. In most cases the non-wovens are reinforced in longitudinal direction by—essentially—parallel warps.

The reinforcing filaments may be used as woven fabric, scrim, knitted fabrics or as non-woven fabric by themselves or in the form of an individual textile fabric. Reinforcements with parallel reinforcing filaments, i.e. warps, as well as scrims or woven fabrics are preferred.

Depending on the wanted property profile, the density may vary in wide limits. Preferably the density is between 20 and 200 filaments per meter. The density is measured vertically to the running direction. Preferably, the reinforcing filaments are added during the formation of the spunbonded non-woven and thus embedded into the spunbonded non-woven. Also preferred is laying a non-woven on the reinforcement or the later formation of a layer of reinforcement and the non-woven fabric by assembling.

Preferred base interlinings according to the invention have at least one reinforcement and show in the stress-elongation diagram (at 20° C.) that the reference force of the base interlining with reinforcement compared to the base interlining without reinforcement differs in the elongation range between 0 and 1% at least one location by at least 10%, preferably by at least 20° %, particularly preferred by at least 30%.

For a whole range of applications a high module with low elongations also at room temperature is wanted. This high module improves the ease of handling, especially of light non-woven fabrics.

Depending on the requirement profile and also on cost aspects, the reference force of the reinforced base interlining may be distributed at low elongations in different proportions on the textile fabric or the reinforcements.

The reference force is measured according to the standard EN 29073, part 3, on samples having a width of 5 cm at a free clamping length of 200 mm. The numerical value of the pretension which is given in Centinewton corresponds to the numerical value of the grammage of the sample, which is given in grammes per square meter.

The base interlining may be reinforced by inserting the reinforcements in the textile fabric, at least one face of the textile fabric or at any location of the base interlining, particularly in other textile fabrics varying from the first textile fabric or as an individual textile fabric.

The base interlining according to the invention may have further textile fabrics in addition to the one already described. Preferably these further textile fabrics differ from the textile fabric first mentioned, i.e. they are made of a different material.

Insofar as the textile fabric is formed of synthetic polymers, it may be necessary to insert further textile fabrics in the base interlining according to the invention to optimize the application-specific properties.

These additional textile fabrics are preferably non-wovens based on mineral fibers and/or glass fibers.

The mineral fiber non-wovens used in the base interlining according to the invention may be solidified by binders or by mechanical measures, such as needle-punching or hydrodynamic needle-punching. Particularly preferred are carded webs from filaments, i.e. endlessly long fibers, or from staple fibers. The average diameter of the mineral fibers is between 8 and 15 µm, preferably between 10 and 12 µm.

Suitable mineral fibers comprise alumosilicate, ceramic, dolomitic fibers or fibers from vulcanites such as basalt, diabase, melaphyre. Those together are denoted as paleobasalts, whereas diabase is readily referred to as greenstone.

The weight per unit area of the mineral fiber non-wovens used according to the invention is between 25 and 200 g/m$^2$, preferably between 30 and 70 g/m$^2$. The information given above are also valid for the glass-fiber mats which will be described in the following.

The glass-fiber mats used in the base interlining according to the invention may be bonded by binders or by mechanical measures, such as needle-punching or hydrodynamic needle-punching. The glass fibers may be filaments or finite or cut glass fibers, the length of the latter fibers being between 1 and 40 mm, preferably 4 to 20 mm.

The average diameter of the glass fibers is between 6 and 20 µm, preferably between 8 and 15 µm.

Suitable glass fibers comprise glass types such as E-glass, S-glass, R-glass or C-glass, E-glass or C-glass being preferred for economic reasons.

The base interlinings according to the invention may be equipped with further functional layers in addition to the additional textile fibers of the glass and/or mineral fibers mentioned above. Hereunder are to be understood measures or functional layers increasing the root strength of the base interlining. These are also object of the invention.

The base interlinings according to the invention may be used for manufacturing coated sarking, roofing and sealing membranes, preferably for manufacturing bituminized sarking, roofing and sealing membranes. Apart from that, the bases according to the invention may be used in flooring applications and in the field of filtration.

In addition to bitumen, other materials such as polyethylene or polyvinylchloride, polyurethanes, EPDM or TPO (polyolefines) may also be used as coating substances for the coated sarking, roofing and sealing membranes.

The bituminized membranes contain at least one base membrane—as described above—embedded in a bitumen matrix, the bitumen parts by weight of the weight per unit area of the bituminized roofing membrane being preferably 60 to 97 wt % and of the spunbonded non-woven is 3 to 40 wt %.

Optionally, the coated sarking, roofing and sealing membranes may afterwards be powdered with a granular material, such as sand. The coated sarking, roofing and sealing membranes thus manufactured distinguish themselves by good workability, particularly bituminized sarking, roofing and sealing membranes.

Manufacturing the textile fabric according to the invention comprises the following measures:
a) Formation of a textile fabric and mechanical bonding thereof,
b) Application of a binder system comprising:
  I) 10 to 90 wt % of an aqueous dispersion of polymerisates based on conjugated aliphatic dienes and vinyl aromatic compounds
  II) 90 to 10 wt % starch,
  III) 0 to 10 wt % additives,
c) Drying and solidification of the binder
with the figures for the percentage by weight relating to the dry mass of the binder system, i.e. without water.

The textile fabric is formed by means of known measures. Preferably the formation of the textile fabric described in a) is carried out through forming a spunbonded non-woven by means of known spinning apparatuses.

For this, the melted polymer is loaded with polymers through a plurality of spinneret rows behind one another or groups of spinneret rows. If a melt binder bonded spunbonded non-woven is to be manufactured, it is alternatingly loaded with polymers forming the base fiber and hot melt adhesive fibers. The spun polymer streams are stretched in a known manner, and are laid on a conveyor belt, e.g., by using a rotating baffle plate in dispersion texture or by forming a curtain.

The mechanical bonding is also carried out by means of known methods.

The insertion of the optionally present reinforcement is carried out during or after forming the textile fabric or before or during the application of the binder system according to the invention. The reinforcement and optionally any further heat treatment in the manufacturing process are preferably added under stress, in particular longitudinal stress.

Further textile fabrics to be optionally inserted are added before or during the solidification of the binder system according to the invention.

The binder system from step b) is also applied by means of known methods. The binder application is preferably between 5 and 50 wt % (dry), particularly 10 and 30 wt %, particularly preferred 10 and 25 wt %, each in relation to the total weight of the textile fabric.

The binder is also dried or solidified by methods known to the person skilled in the art.

The individual methods are known as such, but are patentable in the combination or order according to the invention.

EXAMPLES

The following table 1 shows a comparison of the textile fabrics bonded with the binder system according to the invention against the respective single components of the binders.

A spunbonded non-woven based on polyethylene terephthalate (PET-spunbond) with a weight per area unit of 180 g/m$^2$ (Type JM33/180) is examined.

Example 1 shows a standard binder system based on SBR and urea binder, example 2 shows a binder system based on urea and acrylate, example 3 shows a binder system according to the invention, example 4 shows a binder system based on starch and acrylate, example 5 shows a binder system based on starch. Typically the liquor concentration is 15-40% (i.e. solid matter in liquor)

| Test no. | 1 | 2 | 3 | 4 | 5 |
|---|---|---|---|---|---|
| SBR-dispersion | 90 | | 40 | | |
| urea resin | 10 | 10 | | | |
| acrylate dispersion | | 90 | | 40 | |
| starch | | | 60 | 60 | 100 |
| Set application (% weight of raw non-woven) [%] | 20 | 20 | 20 | 20 | 20 |
| Maximum longitudinal tensile force [daN/5 cm] | 56 | 59 | 57 | 51 | 46 |
| Maximum longitudinal tensile force, hot [daN/5 cm] | 25 | 19 | 27 | n.t. | 31 |
| Maximum cross tensile force [daN/5 cm] | 47 | 48 | 45 | 36 | 36 |
| Longitudinal TDS [%] | 1.8 | 1.9 | 1.3 | 1.6 | 0.8 |
| Cross TDS [%] | −1.6 | −1.8 | −1.4 | −1.7 | −1.3 |
| VW-Test [mg/kg FA] | ~400 | ~400 | ~30 | ~30 | <10 |
| Water suction [mm] | 80 | 72 | 72 | 59 | 66 |

The invention claimed is:
1. A binder system comprising:
  a) 10 to 90 wt % (dry mass) of an aqueous dispersion of polymers based on conjugated aliphatic dienes and vinyl aromatic compounds;
  b) 90 to 10 wt % (dry mass) starch, wherein the starch comprises a mixture of amylose and amylopectin and has a molecular weight $M_w$ between $5 \times 10^4$ and $1 \times 10^7$; and
  c) 0 to 10 wt % (dry mass) additives;
  with the figures for the percentage by weight relating to the dry mass of the binder system;
  wherein a textile fabric is bonded with the binder system,
  wherein the starch replaces a formaldehyde-containing binder component, and
  wherein the polymers are emulsion polymers consisting of:
    a) 20 to 80 parts by weight of conjugated aliphatic dienes,
    b) 20 to 80 parts by weight of vinyl aromatic compounds,
    c) 0 to 10 parts by weight of ethylenic unsaturated carboxylic acids and/or dicarboxylic acids,
    d) 0 to 20 parts by weight of ethylenic unsaturated carboxylic acid nitriles, manufactured in the presence of water, emulgators and water soluble initiators.
2. The binder system according to claim 1, characterized in that the dispersions contain maximally 5 parts by weight of ethylenic unsaturated carboxylic acids and/or discarboxylic acids or derivatives of the acids in polymerized form.

3. The binder system according to claim 1, characterized in that the dispersions contain no ethylenic unsaturated carboxylic acids and/or dicarboxylic acids or derivatives of the acids mentioned above in polymerized form.

4. The binder system according to claim 1, characterized in that the dispersions contain maximally 5 parts by weight of ethylenic unsaturated carboxylic acid nitriles in polymerized form.

5. The binder system according to claim 1, characterized in that the dispersions contain no ethylenic unsaturated carboxylic acid nitriles in polymerized form.

6. The binder system according to claim 1, characterized in that the conjugated aliphatic dienes (component a) are butadiene, isoprene, pentadiene-1.3, dimethylbutadiene and/or cyclopentadiene.

7. The binder system according to claim 1, characterized in that the vinyl aromatic compounds (component b) are styrene, a-methylstyrene vinyl acetate and/or vinyltoluene.

8. The binder system according to claim 1, wherein the aqueous dispersion has a polymer solids content between 30 and 70 wt %.

9. The binder system according to claim 1, characterized in that the viscosity of the dispersions is between 10 and 2200 mPa·s.

10. The binder system according to claim 1 characterized in that the dispersions are anionic dispersions.

11. The binder system according to claim 1 characterized in that the dispersions are partly cross-linked and/or bathotonic and/or thermally cross-linkable dispersions.

12. The binder system according to claim 1, characterized in that the starch is natural or modified or starch derivatives.

13. The binder system according to claim 1, characterized in that the starch is extracted from vegetable raw materials.

14. The binder system according to claim 1, characterized in that the starch is of native vegetable origin or is chemically modified, enzymatically extracted, of recombinant origin or is manufactured by biotransformation (biocatalysis).

15. The binder system according to claim 1, wherein the additives comprise a flame-retardant additive.

16. The binder system according to claim 1, wherein the additives comprise an antistatic agent.

17. The binder system according to claim 1, wherein the starch consists of amylose and amylopectin.

18. The binder system according to claim 14, wherein the starch is a chemically modified starch of the group consisting of starch esters, acetates, phosphates, sulfates, nitrates, starch ethers, oxidized starches, carboxy starch, and starches degraded by persulfate.

19. The binder system according to claim 1, wherein the binder system increases the dimensional stability of the textile fabric by at least 20% in a cross direction compared with a conventional styrene-butadiene binder system that lacks starch.

20. The binder system according to claim 1, wherein the binder system is formaldehyde-free.

* * * * *